United States Patent Office 3,077,908
Patented Feb. 19, 1963

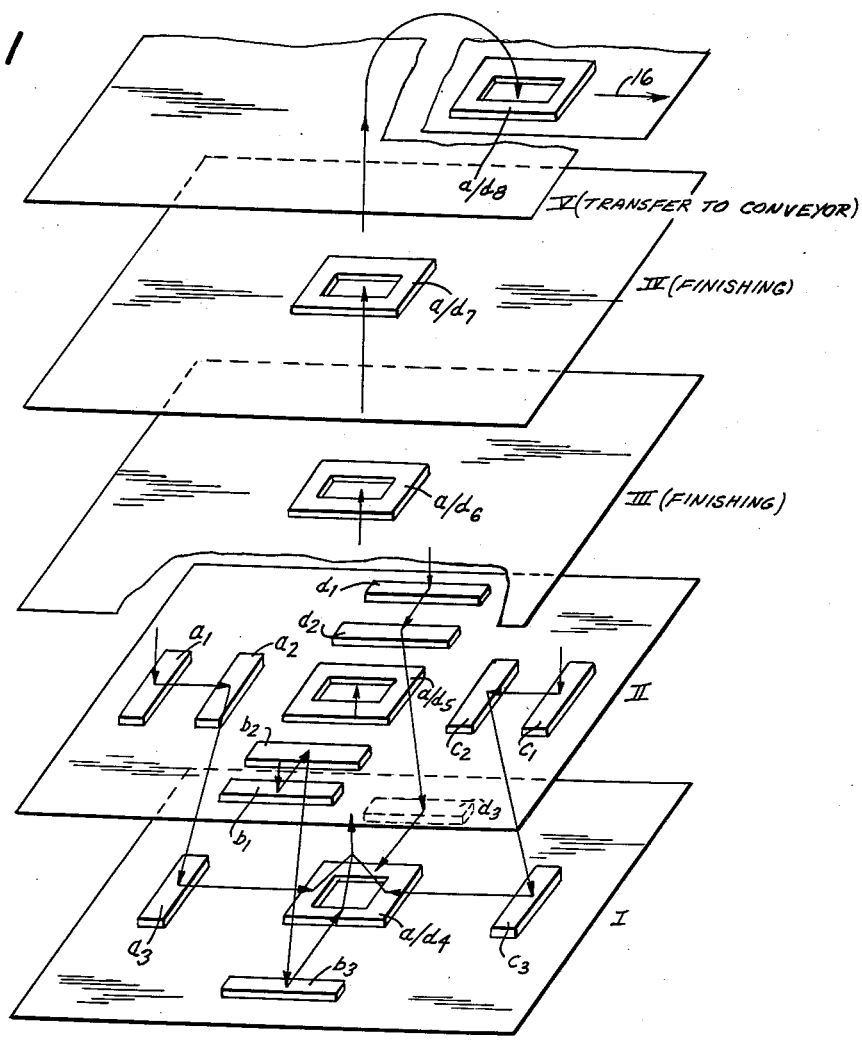

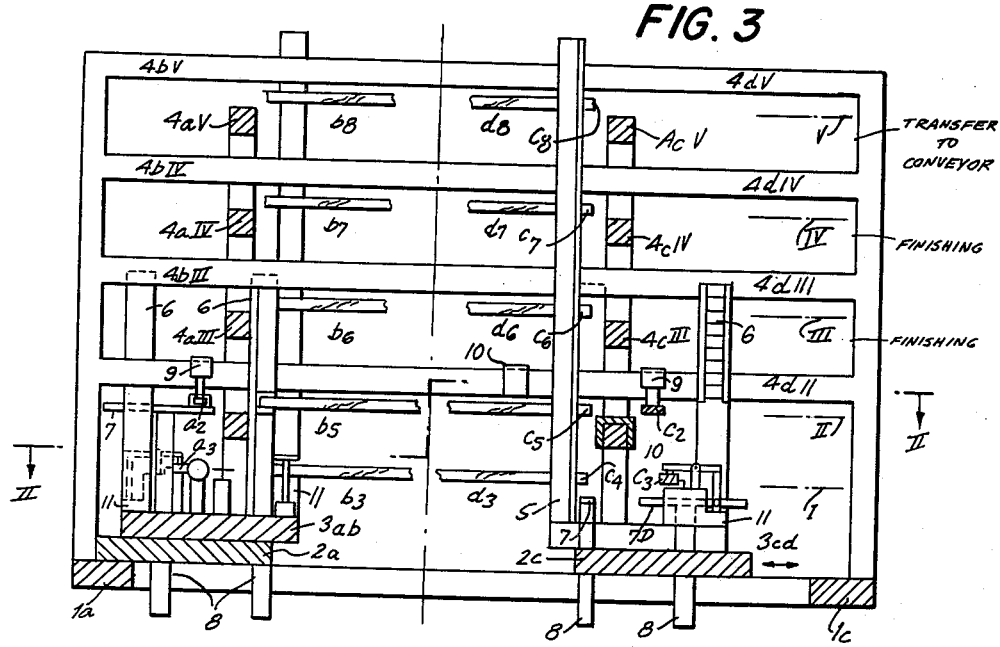

3,077,908
PROCESS AND APPARATUS FOR AUTOMATICALLY MANUFACTURING RECTANGULAR FRAMES
Eduard Righi, 524 Straubingerstrasse,
Landau (Isar), Germany
Filed Feb. 2, 1960, Ser. No. 6,303
Claims priority, application Germany Feb. 2, 1959
11 Claims. (Cl. 144—318)

The present invention relates to a process and apparatus for manufacturing rectangular frames such as window sashes, for example.

At the present time it is customary to manufacture rectangular frames of this type by performing various operations on a number of different machines so that a considerable time is required to manufacture such rectangular frames involving the services of several people and requiring the use of a considerable floor space to accommodate the various machines required.

It is one of the primary objects of the present invention to provide a process and apparatus for manufacturing rectangular frames in such a way that a minimum of floor space is required and also a minimum amount of supervision by attendants is also required.

More specifically, it is an object of the present invention to provide a single compact machine capable of automatically manufacturing rectangular frames.

It is a further object of the present invention to provide a process and apparatus capable of manufacturing frames of this type from elongated frame members which need only have approximate dimensions when in their original condition.

It is also an object of the present invention to provide process and apparatus of the above type which is relatively simple and at the same time utterly reliable as well as providing a large output so that the costs are considerably reduced as compared to the costs involved for the manufacture of a similar article according to conventional methods and with conventional apparatus.

With the above objects in view the invention includes, in a process for manufacturing rectangular frames such as window sashes and the like, the steps of arranging four elongated frame members spaced from each other respectively along the sides of a rectangle in a predetermined plane, and simultaneously moving the four frame members toward an axis normal to the plane passing through the center of the rectangle while maintaining the frame members parallel to the sides of the rectangle until these frame members engage each other to form a rectangular frame, the frame members being finished and treated during their movement toward each other so that they will come together to form a rectangular frame of desired dimensions.

Also with the above objects in view the invention includes, in an apparatus for automatically manufacturing rectangular frames, a rectangular base having a first pair of parallel sides and a second pair of parallel sides perpendicular to the first pair of parallel sides. A stationary elongated support extends along one of the first pair of parallel sides and a movable elongated support extends along the other of the first pair of parallel sides and is supported by the base for movement along the second pair of parallel sides toward and away from the stationary support. At one end of each support is located a stationary carrier and at the other end of each support is located a movable carrier supported on each support for movement toward and away from the stationary carrier thereof, and these four carriers respectively have inner corners directed toward the center of the rectangular base. Four posts are carried by the carriers at their inner corners and extend upwardly from the carriers, and as a result of the movable carriers and movable support it is possible to arrange the four posts at any given distance from each other at the four corners of a rectangle so as to control the size of a rectangular frame formed on the apparatus. The base carries magazines from which blank frame members are automatically moved to a first position where they are finished along three sides while being held only at their ends, to a second position where they engage the posts so as to form the rectangular frame, and during their movement to the posts the ends of the frame members are finished.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective illustration of the process of the present invention, FIG. 1 schematically illustrating the manner in which the components move in the apparatus of the invention so as to be formed into a rectangular frame, all parts of the apparatus being omitted from FIG. 1 so that FIG. 1 clearly illustrates the movement of the frame members during their manufacture into a rectangular frame;

FIG. 2 is a sectional plan view of an apparatus according to the present invention, FIG. 2 being taken along the line II—II of FIG. 3 in the direction of the arrows;

FIG. 3 is a sectional elevation of a machine according to the invention, FIG. 3 being taken along line III—III of FIG. 2 in the direction of the arrows;

Figure 4:
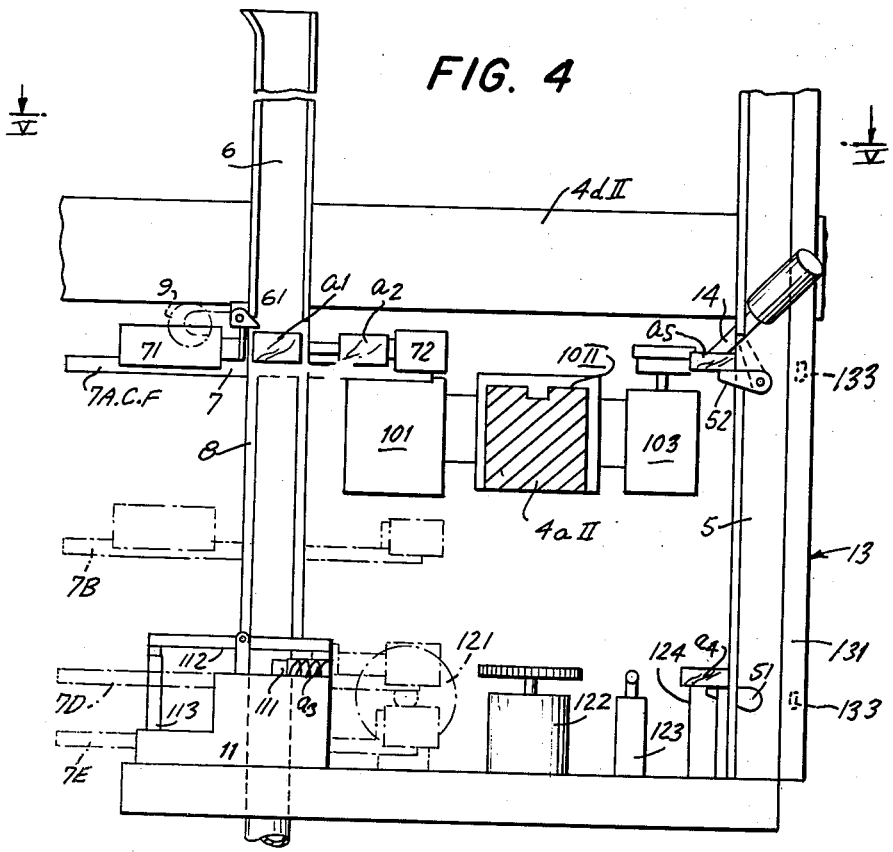
Figure 5:
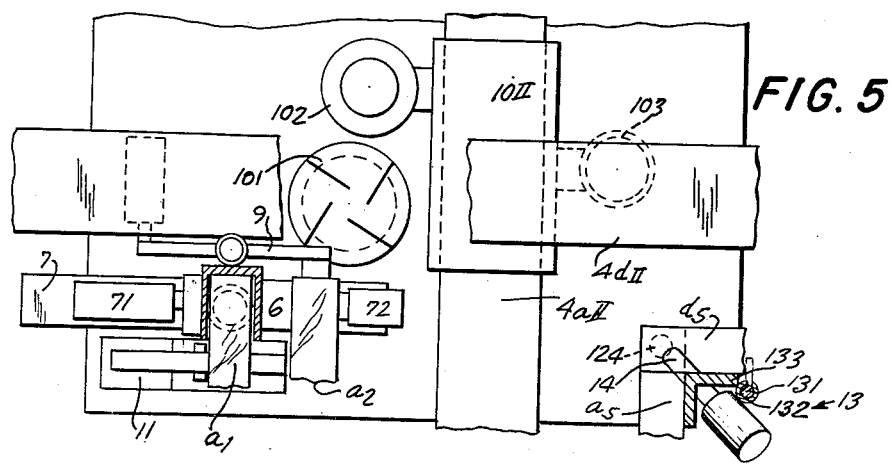
Figure 6:
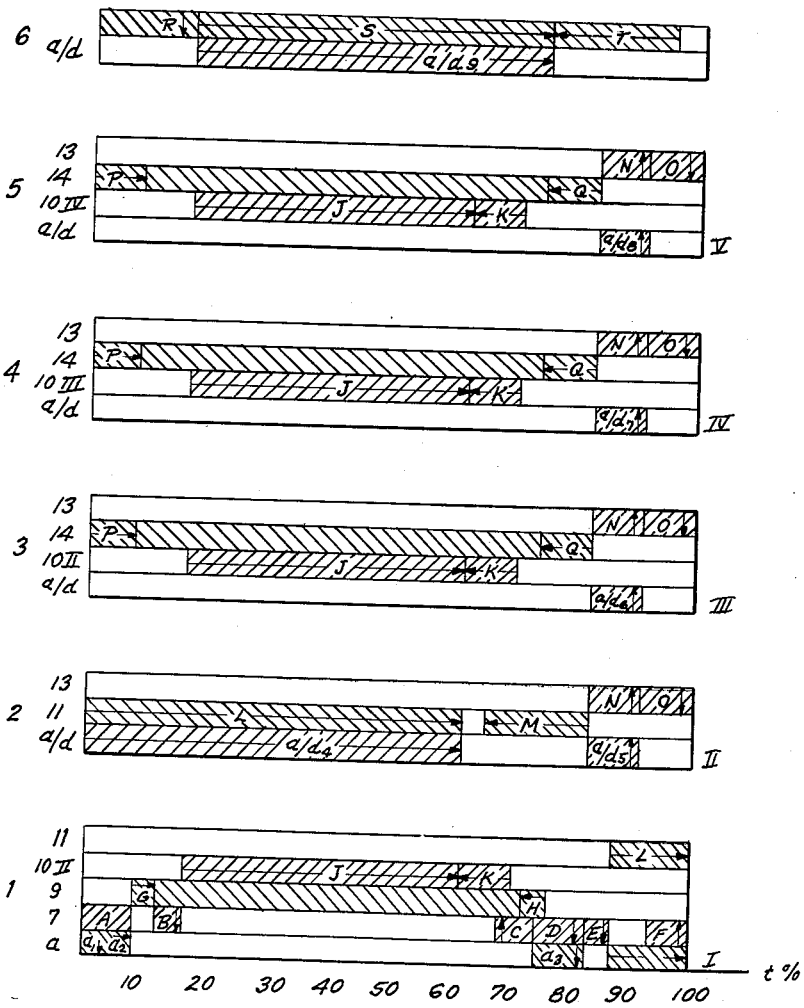

FIG. 4 fragmentarily illustrates part of the machine on an enlarged scale, FIG. 4 being taken along line IV—IV of FIG. 2 in the direction of the arrows;

FIG. 5 is a plan view of the structure of FIG. 4 taken along line V—V of FIG. 4 in the direction of the arrows; and FIG. 6 graphically illustrates the sequence of operation and the duration of operation of the various parts of the structure of the invention.

Referring first to FIG. 1 which illustrates the process of the invention it will be seen that four elongated frame members $a$, $b$, $c$, $d$ are first in a position which is indicated by the numerals which follow the letters. Thus, it will be seen that the elongated frame members $a1$, $b1$, $c1$, $d1$ are located in a plane II spaced from each other and arranged along the sides of a rectangle. As will be apparent from the description which follows, this is the position which the frame members take when they are released from magazines. While these frame members are in plane II they are simultaneously moved inwardly toward an axis normal to plane II and passing through the center of the rectangle along whose sides the frame members are respectively located. Thus, it will be that the frame members a1—d1 become shifted to the positions a2—d2, and as is pointed out below, in these positions a2—d2 the frame members a—d are held only at their ends and are finished along their opposed side faces as well as along their inner edges which are directed toward the central axis of the rectangle referred to above.

After the frame members a2—d2 are finished in this way they are lowered to the plane I which is parallel to but below the plane II, and thus the elongated frame members reach the positions a3, b3, c3, d3 clearly shown in plane I in FIG. 1. In the plane I the several elongated plane members are supported by suitable carriages which leave the ends of the frame members free and which move the frame members simultaneously toward the axis normal to the plane I and passing through the center of the rectangle along whose sides the elongated frame members a3—d3 are respectively located. During this movement of the several frame members they move past machines such as saws and slot cutters as well as past a glue applying means so that in this way the ends of the elongated frame members are finished and the finishing is such that these frame members will join together to form a rectangular frame a/d4 shown in FIG. 1.

The frame members which are thus joined together according to the invention to form the rectangular frame a/d4 may be nailed together at the corners of the rectangular frame while the rectangular frame is in the plane I, and then according to the next step of the process of the invention the frame is moved back up to the plane II where the rectangular frame is indicated at a/d5. It will be noted that the elongated frame members a2, b2, c2, d2 in the plane II are parallel to but spaced from the rectangular frame a/d5, and according to the process and apparatus of the invention suitable finishing tools finish the outer peripheral edge of the frame a/d5 simultaneously with the finishing of the inner edges and the upper and lower faces of the elongated frame members a2—d2.

After the outer periphery of the frame a/d5 is finished in this way in the plane II the frame is raised up to the plane III parallel to and located over the plane II, and then from the plane III to the plane IV, the frame being shown at a/d6 and a/d7 in the planes III and IV, respectively. In these planes III and IV the frame is acted on by suitable tools which form openings, cutouts, and the like to enable the frame to properly receive the desired fittings, hardware, etc., so that the completed window frame can be formed in the illustrated example, and from the plane IV the finished frame a/d7 moves up to the plane V parallel to and located over the plane IV where the finished frame a/d8 is engaged by a suitable gripping device which automatically places the finished frame on a conveyor band 16 which moves the finished frame off to the right, as viewed in FIG. 1, to places where the frame can be packed for shipment, where it can be further treated such as by being painted, etc.

Because of the fact that the elongated frame members are finished on all sides and at their ends with the process and apparatus of the present invention the blank elongated frame members which are shown at a1, b1, c1, d1 need only have approximate dimensions.

A machine for manufacturing rectangular frames according to the invenittion is shown schematically in FIGS. 2 and 3. In FIG. 3 the various planes I–V of FIG. 1 are indicated in relation to the machine, and it will be noted that the various parts are designated with respect to these planes as well as with respect to the several elongated frame members a–d, so that many of the parts of the machine are designated with reference to their elevation and the particular frame member with which they cooperate.

Referring now to FIGS. 2 and 3, it will be seen that the machine includes a rectangular base 1 having four sides 1a, 1b, 1c and 1d. A pair of vertical stationary frameworks 4b and 4a carried by and extend upwardly from the horizontal base 1. Thus, it will be seen that the vertical framework 4b extends across the base 1 from the side 1a to the side 1c thereof in a direction parallel to the side 1b, and as is particularly apparent from FIG. 3 the vertical framework 4b includes a plurality of horizontal arms 4bII, 4bIII, 4bIV, and 4bV which are located approximately at the planes II–V, respectively as indicated in FIG. 3. The stationary vertical framework 4a is quite similar to the framework 4b and extends from the side 1d to the side 1b of the base parallel to the side 1a thereof, and this vertical stationary framework 4a has horizontal arms extending completely across the machine, the elevation of these arms 4aII, 4aIII, 4aIV, and 4aV being indicated in FIG. 3. Thus, as is apparent from FIG. 3 the horizontal arms of the vertical framework 4b extend over and across the corresponding horizontal arm of the perpendicular vertical framework 4a.

A movable framework 4c is provided, this framework 4c being identical with the framework 4a except that it is supported by the arms 1b and 1d of the base for movement to the right and left, as viewed in FIGS. 2 and 3, and as is indicated by the arrows in FIG. 2. Also, the structure includes a movable framework 4d which is identical with the stationary framework 4b and which is supported by the sides 1a and 1c of the base for movement toward and away from the stationary vertical framework 4b, as indicated by the arrows in FIG. 2. Thus, the horizontal arms of the movable framework 4c respectively extend beneath the horizontal arms of the movable framework 4d. As is apparent from FIG. 3, the arms of the vertical frameworks which cross over each other are located respectively above and respectively below the planes to which they correspond. For example, in the case of plane III indicated in FIG. 3 it will be seen that the arms 4bIII and 4dIII are located slightly above while the arms 4aIII and 4cIII are located slightly below the plane III, and the same is true of the other horizontal framework arms with respect to the other respective planes.

The base 1 also carries an elongated stationary support 2a and an elongated movable support 2c. The elongated stationary support 2a is in the form of a rectangular plate extending along the side 1a from the side 1b to the side 1d of the base, and the movable elongated support 2c is identical with the support 2a and extends along the side 1c between the sides 1b and 1d of the base, the movable support 2c being movable along the pair of parallel sides 1b and 1d toward and away from the stationary support 2a, and it will be noted that the supports 2a and 2c extend parallel to the other pair of sides 1a and 1c of the base.

The stationary support 2a fixedly carries a stationary carrier 3ab in the form of a square plate fixed to the upper face of the support 2a, and the stationary support 2a also carries a movable carrier 3da identical with the carrier 3ab except that the carrier 3da is guided by the support 2a for movement toward and away from the stationary carrier 3ab as indicated by the double headed arrow on the movable carrier 3da. In the same way the movable support 2c carries adjacent one of its ends a stationary carrier 3bc and adjacent its opposite end a movable carrier 3cd which is shiftable toward and away from the stationary carrier 3bc as indicated by the double headed arrow on the movable carrier 3cd. The reference characters of the several carriers indicate that each carrier cooperates with parts of a pair of elongated frame members. Thus, for example, the carrier 3ab carries structure which cooperates with the frame members a and b, while the carrier 3da carries structure which cooperates with the rectangular frame members d and a, and so on. Any suitable structure may be provided for guiding the movable parts for movement with respect to the stationary parts. For example, dovetail tongues and grooves may be provided to guide the vertical frameworks 4c and 4d for movement on the base as well as to guide the elongated support 2c and the carriers 3da and 3cd for movement in the manner indicated above.

As is particularly apparent from FIG. 2 the several square carriers respectively have inner corners directed toward the center of the base 1, and at these corners the several carriers respectively carry upstanding posts 5 in the form of angle irons, as is apparent from FIGS. 2 and 3. These posts 5 are fixed in any suitable way to the inner corners of the several carriers, and it will be noted that the angle included between the pair of sides of each angle iron is directed toward the center of the base so that each angle iron has an exterior surface which will form part of a rectangle as indicated in FIG. 2. Because of the above-described structure according to which the base carries a movable and a stationary elongated support and according to which the pair of supports each carry a stationary and a movable carrier, it is possible to position the posts 5 at any desired distance with respect to each other so that they extend through the corners of a rectangle of any desired dimensions, and in this way the structure of the invention is capable of being easily adjusted so as to manufacture rectangular frames of any desired size within the maximum and minimum limits of the machine.

If desired, the elongated support 2c and the vertical framework 4c which move in the same direction can be fixed to each other for movement together.

The elongated frame members before they are worked on by the structure and process of the invention are stored in magazines which are also constructed according to the present invention. The magazines 6 for the elongated frame members are in the form of vertically extending channel members fixed to and extending upwardly from the carriers 3ab, 3bc, 3cd, 3da. The pair of channel members 6 which cooperate together to form one magazine have their hollow interiors directed toward each other. Thus, referring to the right central portion of FIG. 2 it will be seen that the pair of channel members 6 which form the magazine for the elongated frame members c have their interiors directed toward each other so that the members c which are stacked one above the other as is clearly apparent from FIG. 3 are guided at their ends by the pair of vertical channel members. In the same way the other carriers carry channel members. Thus, the carrier 3ab carries one channel member 6 adjacent its lower right hand corner, as viewed in FIG. 2, which forms the left channel member of the magazine for the elongated frame members b, the other channel member for this magazine being shown at the lower left corner of the carrier 3bc, this carrier also carrying one of the channel members 6 for the beams c, described above, and the carrier 3ab also carries adjacent its upper left corner, as viewed in FIG. 2, a channel member 6 which forms part of a magazine for the elongated frame members a which are identical to the frame members c, the other channel member 6 for the frame members a being fixedly carried by the carrier 3da adjacent its lower left corner, as viewed in FIG. 2, and adjacent its upper right corner the carrier 3da fixedly carries the channel member 6 which forms part of the magazine for the elongated frame members d, the other part of this latter magazine being in the form of the channel member 6 which is shown in FIG. 3 carried by the carrier 3cd at its upper left corner, as viewed in FIG. 2. Of course when the several movable parts 2c, 3da, and 3cd are set to locate their posts 5 at a given distance from each other the magazine channel members will be positioned with respect to each other so as to accommodate the blank elongated frame members which will be formed according to the process and apparatus of the invention into the desired rectangular framework.

The several channel members 6 respectively have rear walls which extend all the way down to and are fixedly connected with the several carriers, but the pair of parallel side walls of each channel member 6 terminates at their bottom ends just above the plane II, as is particularly apparent from FIG. 3. Moreover, as is shown most clearly in FIG. 4, each of the channel members 6 carries adjacent the lower end of its pair of side walls a device 61 of a known construction which is pivotally supported in such a way that it will permit only the lowermost elongated frame member of the magazine to fall from the magazine while retaining the others.

The several carriers respectively carry adjacent to the channel members 6 vertically extending hydraulic jacks 8 which can be in the form of telescoped tubes to the interior of which a fluid is supplied under pressure in order to expand the telescoped tubes and thus increase the extent to which they extend upwardly from the carriers, and also through suitable valves the fluid may be withdrawn from the interior of each set of telescoped tubes so as to permit a structure carried thereby to be lowered, and this structure is controlled in a known way so as to cause the articles carried by the several jacks 8 to be raised and lowered in a step wise fashion as indicated below.

The several jacks 8 respectively carry at their top ends elongated bars 7, as indicated most clearly in FIG. 4, and these bars 7 respectively extend across the channel members 6 beneath the side walls thereof, as is clearly shown in the drawings.

The several horizontal bars 7 are supported by the jacks 8, respectively, at the start of the operation with the upper faces of the several bars 7 located in the plane II. Each of the bars 7 carries a pair of hydraulic or pneumatic devices 71 and 72 each of which includes a cylinder and a piston so that when a fluid under pressure is supplied to the interior of the cylinder the piston will move out while when the fluid is withdrawn the piston will return, all of these pneumatic and hydraulic devices of the entire machine being connected through suitable flexible conduits which are not illustrated to a source of fluid under pressure and being controlled by suitable valves which may be automatically actuated either from cam shafts in a desired sequence or from well known electrical structure which will energize and de-energize solenoids in a predetermined sequence so as to open and close the valves in such a way that the structure will operate in the desired sequence, as pointed out more particularly below in connection with Fig. 6.

At the start of the operation with the bars 7 located with their top faces at the elevation of plane II, the devices 71 are actuated so that their pistons will move outwardly, the piston of the device 71 of FIG. 4 moving to the right, as viewed in FIG. 4, and as a result these pistons will all simultaneously actuate the several devices 61 at the bottom ends of the channel members 6 of all of the magazines so that these devices 61 will turn in a counter clockwise direction, as viewed in FIG. 4, to release the lower most elongated frame members in the several magazines while preventing downward movement of the stack of frame members over the lowermost ones, and in this way the several frame members move to the positions a1, b1, c1, d1, as described above in connection with FIG. 1, and the frame member a1 is illustrated in FIG. 4. The pistons of the several devices 71 continue to move outwardly so as to simultaneously shift the frame members to the positions a2, b2, c2, d2, these positions being determined by the devices 72 which are not actuated at this time. Thus, the several devices 71 actuate the several devices 61 so as to release the lowermost frame members which fall on to the bars 7 so as to become located in the plane II, and the continued movement of the pistons of the several hydraulic or pneumatic devices 71 shifts the rectangular frame members up to the positions a2, b2, c2, d2 where these devices are located in engagement with the devices 72.

At this time the end engaging devices 9 are actuated, these devices 9 also being hydraulically or pneumatically actuated. The structure of the devices 9 is particularly apparent from FIG. 5 which shows that they are in the form of levers pivotally mounted intermediate their ends and turned by the piston of a pneumatic or hydraulic device, this latter piston sliding in a suitable cylinder, as is apparent from the left portion of FIG. 5. When the lever of the device 9 is turned in a clockwise direction, as viewed in FIG. 5, the right end of the lever will engage the end of the frame member a2 which is visible in FIG. 5, and in the same way all of the devices 9 press against the respective ends of the several frame members in the positions a2, b2, c2, d2. The several end holding means 9 may be carried by the rear walls of the channel members 6, which is to say the bearings for pivotally supporting the levers of the devices 9 are carried by these rear walls, while the hydraulic or pneumatic cylinders or pistons which turn these levers are carried by the horizontal arms of the vertical framework, although the devices 9 can be supported in any suitable way.

Thus, after the several frame members have been moved to the positions a2, b2, c2, d2 they are held at their ends by the several holding means 9, and now the pistons of the hydraulic or pneumatic devices 71 can be withdrawn and the telescoped jacks 8 are contracted so as to lower the several bars 7 from the position 7A to the elevation 7B, thus leaving the several elongated frame members held only at their ends by the devices 9 in the plane II.

In this way the several bars 7 are positioned at the elevation 7B indicated in dot-dash lines in FIG. 4, and the several frame members are exposed along their longitudinal surfaces so as to be capable of being finished at these surfaces. The downward movement of the bars from the position 7A to the position 7B indicates a lowering of these bars by one step.

For the purpose of finishing the frame members which are thus held in the plane II only at their ends, the several horizontal arms 4aII, 4bII, 4cII, and 4dII respectively support tool carriers capable of shifting along these arms and carrying the tools which act on the inner side edges and on the upper and lower faces of the several frame members to finish these surfaces. Thus, as is particularly apparent from FIG. 4, each of these horizontal arms of the several frame works adjacent the plane II slidably supports a carriage 10, the carriage 10II of the arm 4aII being indicated in FIG. 4 as well as in FIG. 5, and all of the other carriages are of the same construction. These tool carriers or carriages 10 carry electrically driven tools 101 and 103. These tools are of conventional structure for finishing the upper and lower faces as well as the inner side edges of the several elongated frame members during movement of the tool carrier 10 along the horizonal arms of the several frame works, and an unillustrated mechanical hydraulic structure cooperates with the carriages 10II for shifting these carriages from a starting position respectively along the several arms 4aII, 4bII, 4cII and 4dII in order to finish the frame members and then the tool carriers 10 are automatically returned to their starting position. In this way the several frame members are finished at all surfaces except outer side edges and ends. Now the jacks 8 expand so as to raise the bar 7 from the position 7B to their original elevation so that these bars now assume the position 7C which is the same as the position 7A, and the devices 9 are actuated so that their levers turn to move the free ends of these levers away from the several frame members which now rest again on the several bars 7, and these bars are lowered through contraction of the jacks 8 down to the elevation 7D indicated in dot-dash lines in FIG. 4.

In this way the bars 7 serve to lower the elongated frame members from the plane II to the plane I, and when the bars 7 reach the position 7D the several elongated frame members will rest on carriages 11.

The bars 7 at the elevation 7D thus locate the several elongated frame members in the positions a3, b3, c3, d3 and at this time with the elongated frame members resting on the carriages 11 the devices 72 are actuated so that pistons move outwardly away from the cylinders of these devices and shift the several elongated frame members against the stops 111 of the carriages 11. With the frame members thus positioned against the stops 111 the hydraulic or pneumatic devices 113 (FIG. 4) are all actuated so as to move their pistons upwardly out of their cylinders, and these pistons are connected at their top ends to the levers 112 which turn at this time in a clockwise direction, as viewed in FIG. 4, so that their inner ends will engage the elongated frame members to press the same downwardly against the carriages 11, as indicated for the frame member a3 in FIG. 4. Thus, it is seen that the devices 112, 113 are very similar to the devices 9 described above, these devices 112, 113 being respectively carried by the carriages 11 for clamping the several elongated frame members to these carriages. With the several frame members thus connected to the carriages 11 the pistons of the devices 72 are retracted and the bars 7 are further lowered to the lowermost position 7E indicated in dot-dash lines in FIG. 4. Thus, at this time the frame members are supported only by the carriages 11 which are now actuated so as to move the several elongated frame members from the positions a3, b3, c3, d3, inwardly toward each other in the plane I so as to form the frame a/d4, and in this position the several frame members will engage the posts 5, as indicated most clearly in FIG. 2. The carriages 11 are guided in any suitable way such as by dovetail tongues and grooves formed in part in the carriages 11 and in part on the carriers 3ab, 3bc, 3cd, and 3da, and the carriages 11 may be formed with threaded bores whose axes extend in the direction of movement of the carriages and screws may extend into these bores so that when the screws are turned the carriages are moved along the several carriers, all of these screws being driven by any suitable motors or the like at the proper moment in the sequence of operations. As soon as the carriages 11 advance the several elongated frame members inwardly toward the posts 5 by distance sufficient to locate the frame members beyond the bars 7, the jacks 8 expand to return the bars 7 to their original elevation so that the bars 7 are now at the position 7F indicated in FIG. 4, and this represents the end of the operations of the bars 7 which now receive the next elongated frame members which are again acted upon in the same way so as to reach the position a2, b2, c2, d2.

It will be noted, particularly from FIG. 2 at the left central portion thereof, that when the frame members are supported on the carriages 11 the end portions of the frame members extend freely beyond the carriages. Thus, the frame member a3 is carried by the carriage 11 at the lower left of the carrier 3da and by the carriage 11 at the upper left of the carrier 3ab of FIG. 2, and it will be seen that the free ends of the frame member a3 are located well beyond the carriages 11. The same is true of all of the other elongated frame members. During movement of these frame members toward the posts 5 in the plane I the ends of the frame members move past a series of tools which finish the ends. These tools are carried by the several carriers and it will be seen that each end of each frame member moves first past a saw 121 and then past a notch cutter 122, and finally past a glue applying means 123, these tools being schematically indicated on an enlarged scale in FIG. 4. The saws 121 serve to trim off the ends of the frame members so that they will have a predetermined precise length, while the notch cutters 122 provide the ends of the frame members with notches passing therethrough. The notch cutters 122 which cut the notches in the ends of one frame member are at a slightly different elevation from the notch cutters 122 which cut the notches in the adjoining frame members so that in this way the frame members are provided with tongues on one frame member located at the elevation of notches on the adjoining frame member and thus when the frame members engage each other and finally are located against the post 5 the tongues of the several frame members will be located in the notches of the adjoining frame members so that in this way all of the frame members are joined together to form the rectangular frame a/d4 in the plane I, and of course the devices 123 have in the meantime applied glue to the ends so that they adhere to each other.

Referring to FIG. 4, it will be seen that each of the posts 5 fixedly carries adjacent its bottom end a projection 51 whose top surface is in the plane I, and thus when the carriages 11 are retracted to their starting positions the frame a/d4 will rest on the projections 51 which maintains the frame a/d4 at the elevation of the plane I even after the carriages 11 are withdrawn. However, before the carriages 11 are withdrawn the several frame members are nailed to each other by an automatic nailing device 124 located adjacent the posts 5 so as to be arranged beneath the corners of the rectangular frame, and when the frame is first formed and while it is still held by the carriages 11 the device 124 of known construction works on each corner of the rectangular frame to nail the frame members to each other and thus form a unitary frame.

A raising means is provided for raising the rectangular frame upwardly along the posts 5, and in the illustrated example this raising means takes the form of a pair of devices 13 respectively carried by a pair of carriers adjacent a pair of diagonally opposed posts 5, such a pair of devices 13 being indicated in FIG. 2. As is particularly apparent from the FIGS. 4 and 5 each of the devices 13 includes an elongated hollow tube 131 formed with a longitudinal slit, and a cable or bar 132 is vertically slidable in the tube 131 and fixedly carries at several elevations a plurality of pawls 133 capable of turning upwardly with respect to the cable or bar 132 but incapable of turning downwardly beyond a horizontal position. Thus, these pawls 133 when engaging beneath a frame will lift the same during raising of the rod or cable 132, but at the same time the pawls 133 when moving downwardly to engagement with a frame can be turned upwardly by the frame and can then fall down to a position beneath the frame.

Similar pawls 52 are pivotally connected to the several posts 5 at the several elevations of the planes II–V, and as is apparent from the upper right portion of FIG. 4 each of the pawls 52 is turnable in a vertical slot of the angle iron of post 5 so that this pawl 52 can turn upwardly from the solid to the dot-dash line position indicated in FIG. 4 but can only turn back down to the horizontal position indicated in FIG. 4. Thus, the frames can be moved upwardly beyond each pawl 52 but once the latter has fallen back to its horizontal position indicated in solid lines in FIG. 4 the frame will engage the pawl 52 and cannot move downwardly beyond the same. The several rods or cables 132 are reciprocated back and forth at the desired moment in the cycle of operation so as to move back and forth through a stroke which is somewhat greater than the distance between the several operating planes I–V, and in this way the several pawls 133 will engage a frame at one elevation and move it up to the next operating plane where it will be held by the pawl 52. Thus, considering FIG. 4, it will be seen that the lowermost pawl 133 will engage beneath the frame a/d4 and during upward movement of the rod or cable 132 this frame will necessarily be raised up to an elevation slightly higher than the plane II, and now the cable or rod 132 is lowered to its starting position so that the lower-most pawl 133 will now fall below the lower-most frame which is next formed on the stationary projections 51. The frame which has thus been raised will not fall since it has been raised to an elevation sufficient to permit the pawls 52 to return to their solid line positions indicated in FIG. 4 and thus the frames a/d5 will be maintained at the elevation of the plane II, and it will be seen, as is particularly apparent from FIG. 4, that the tool carrying carriages 10II carry in addition to the tools 101 and 102 the tools 103 which act on the outer peripheries of the frames a/d5 simultaneously with the action of the tools 101 and 102 on the several frame members which are not yet joined together and which are in the positions a2, b2, c2, d2, as pointed out above and as is particularly apparent from FIG. 4.

In order to maintain the frames securely on the pawls 52 during finishing of the frames the several posts carry pneumatic pressing devices 14 which are actuated so as to have their pistons sent downwardly on to and press against the frames so as to press them against the pawls 52, and in this way the frames are securely locked at the elevations of several working planes while the frames are worked on, the several hydraulic pressing devices 14 being actuated at the proper sequence with respect to the other parts of the machine. Thus, with the raising means of the invention the frames will be raised in step by step fashion through the several operating planes indicated in FIG. 1, and in the planes III and IV unillustrated tools carried by carriages such as the carriage 10II described above which are shiftable along the corresponding horizontal arms of the vertical frameworks act on the frame so as to provide the latter with the necessary bores, cutouts, and the like so that suitable hardware and fittings can be joined to the several frames.

Finally, the frames will reach the elevation V where a suitable means will deposit each frame on the conveyor 16.

After the machine of the invention has been operating for a period of time there is a series of frames located one above the other in the several operating planes indicated in FIG. 1, and at each step the entire series of frames are shifted upwardly along the post 5 from one plane to the next, all of these planes I–V of FIG. 1 being equal distance from each other.

Of course, before the carriages 11 are retracted to their starting positions the gripping devices 112, 113 are actuated so as to release the frame members so that the frame a/d4 will remain at the post 5 resting on the projections 51, as described above.

In order to guide the movable vertical framework in a perfectly secure manner, it is possible to arrange an outer framework around the machine, this outer framework being provided at the elevation of the top ends of the movable vertical frameworks 4c and 4d with elongated slots which receive pins fixed to these movable frameworks 4c and 4d so that in this way the latter frameworks are guided at their top end as well as at their bottom end.

One possible sequence of operations of the structure of the invention is indicated in graph form in FIG. 6 which shows various steps in the operation and which has as its abscissa the time required for the entire operation in terms of percents so that the time extends from zero to 100% and the duration of operations of the various components, indicated by the shaded areas on FIG. 6, are indicated on FIG. 6 in terms of percent of the entire duration.

Referring to the lower-most cycle 1 indicated at the lower part of FIG. 6, it will be seen that the bar 7 remains at the elevation A during approximately the first 10% of the cycle, the device 61 being actuated at this time so as to unlock the lower-most frame members from the magazine so that they will drop down and then be advanced by the devices 71 to the positions a2, b2, c2, d2, as indicated for the frame member a in the lower-most part of the first cycle indicated at the bottom of FIG. 6. The end engaging or holding means 9 is then actuated to engage the ends of the frame members during the period G indicated in FIG. 9, and it will be seen that the holding means 9 remains engaged until slightly more than 70% of the entire operation 1 shown at the lower part of FIG. 6, whereupon during the time H the means 9 returns to its starting position so as to unlock the frame members. It will be noted that before the end holding means 9 releases the frame members the bar 7 has returned during the period C so as to support the frame members and then during the period D returns the frame members downwardly to the lower plane, the bars 7 moving further downwardly during the period E and finally returning to the starting position during the last period F. The first cycle of operations as well as all of the remaining cycles which take place simultaneously with the first cycle starts and ends with the release of the lowermost frame members from the magazines and the return of the bars 7 to their starting position, respectively. The tool carrying carriages 10II operate during the period J indicated in FIG. 6 to finish the inner side edges and top and bottom faces of the frame members, the tools returning to their starting position during the period K indicated in FIG. 6, and just before the end of the first cycle which is to say during slightly more than the last 10% thereof the carriages 11 are actuated during the period L to start the movement of the separate frame member toward the posts 5 so that their ends will be finished and so that they will form the frame a/d4.

During the second cycle of operations shown as cycle 2 in FIG. 6 the carriages 11 continue to advance for more than 60% of the cycle, the operations of cycle 1 taking place simultaneously in the manner indicated in FIG. 6. The carriages 11 return during the period M indicated in cycle 2 and it will be seen that after the return of the carriages 11 the raising means 13 operates to raise the frame a/d4 up to the position of the frame a/d5, the raising means 13 descending to its starting position during the period O in each of the cycles except cycle 1 and cycle 6 shown in FIG. 6.

It will be seen from FIG. 6 that cycles 3-5 which respectively take place at the planes III-V are substantially identical except that of course different tool carriers 10II, 10III, and 10IV are operating at the various elevations, the tool carrier 10II operating during the first and second cycles to simultaneously finish the outer periphery of the frame a/d5 while finishing the inner edges and top and bottom faces of the frame members a2, b2, c2, d2, as pointed out above.

In the elevations III and IV the frame is further finished so as to be able to receive the various hardware and fittings, and in cycle 6 indicated in FIG. 6 a suitable means operates during the period R to engage the frame a/d8, during the period S to deposite this frame on the conveyor 16, and during the period T this latter means returns to its starting position.

The cycles 3-5 additionally indicate the periods of operation of the pressing means 14 which during the period P is actuated to engage the frames at the various elevations pressing the same against the pawls 52, as pointed out above, these pressing means remaining engaged from 10 to approximately 70% of the operation, and then being retracted during the period Q indicated in cycles 3-5.

As is apparent from FIG. 6, all of the six illustrated cycles start and end simultaneously and at the very beginning of the several cycles the carriages 11 are all already operating to advance the frame members toward the posts 5, while at the same time at the beginning of all cycles all of the pressing means 14 at the several elevations are actuated and the devices 71 on the bars 7 are all actuated to release the lower-most frame member. The several tool carriages 10 are set into operation after approximately 17% of each cycle and return of the carriages 10 takes place after approximately 62% of the several cycles. The carriages 11 do not start to operate until approximately 87% of the first cycle has been completed, and these carriages continue to operate from the end of the first cycle through approximately 63% of the second cycle.

It will be understood that each of the elements described above, or two or more together, may also find a useful application in other types of rectangular frame manufacturing process and apparatus differing from the types described above.

While the invention has been illustrated and described as embodied in process and apparatus for automatically manufacturing window sashes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for manufacturing rectangular frames, the steps of arranging in spaced relaton to each other in a predetermined upper plane four elongated frame members respectively located along the sides of a rectangle in said plane, each of said frame members having opposed side faces and an inner side edge directed toward an axis normal to said plane passing through the center of said rectangle and an outer side edge directed away from said axis; finishing said inner side edges and said opposed side faces of said thus-arranged frame members; lowering the thus-finished frame members from said upper plane to a lower plane parallel to said upper plane; moving said frame members toward said axis while said frame members remain in said lower plane parallel to the sides of said rectangle; finishing the ends of said frame members while they move toward said axis in said lower plane, said frame members forming a rectangular frame when they join each other in said lower plane; raising said rectangular frame along said axis back to said upper plane; arranging in said upper plane a second set of four elongated frame members respectively located along said sides of said rectangle in said upper plane in spaced relation to each other so that said second set of frame members are already arranged in said upper plane when said frame member formed from said first-mentioned frame members returns to said upper plane; and finishing the outer edges of the rectangular frame formed from said first-mentioned frame members while simultaneously finishing the inner edges and opposed side faces of the second set of frame members in said upper plane.

2. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corner thereof and extending upwardly therefrom, said four posts being parallel to each other, whereby by adjustment of said movable support on said base relative to said stationary support and by adjustment of said movable carriers on said supports relative to said stationary carriers the positions of said posts relative to each other may be regulated so that said posts extend respectively through the corners of a rectangle of a given size; a plurality of moving means carried by said carrier for moving four elongated frame members toward and into engagement with said posts where said frame members engage each other at their ends to form a rectangular frame; tool means respectively carried by said carriers for finishing the ends of said frame members during movement of the same by said moving means toward said posts; glue applying means carried by said carriers for applying glue to the finished ends of said frame members during movement of the latter by said moving means toward said posts; nailing means carried by each carrier adjacent the post carried thereby for nailing together the adjoining ends of a pair of frame members located at said post; support means carried by said posts for supporting the frame after said moving means moves away from the latter; and pressing means carried by each post for pressing the rectangular frame downwardly against the support means carried by each post to fix the rectangular frame during the nailing thereof by said nailing means.

3. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby by adjustment of said movable support on said base relative to said stationary support and by adjustment of said movable carriers on said supports relative to said stationary carriers the positions of said posts relative to each other may be regulated so that said posts extend respectively through the corners of a rectangle of a given size; a pair of stationary vertical frameworks fixed to and extending upwardly from said base and respectively extending along one of said first pair of sides thereof and one of said second pair of sides thereof and each of said frameworks including a plurality of horizontal arms respectively located at different elevations and extending across said base; a pair of movable frameworks respectively carried by said base and respectively extending parallel to the other of said first pair of sides thereof and the other of said second pair of sides thereof, said movable frameworks being movable along said base parallel to said one of said first pair of sides thereof and said one of said second pair of sides thereof, respectively, and said movable frameworks each having also a plurality of horizontal arms located at different elevations and extending across said base; and a plurality of tool carriers respectively carried by said horizontal arms and being shiftable therealong.

4. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby by adjustment of said movable support on said base relative to said stationary support and by adjustment of said movable carriers on said supports relative to said stationary carriers the positions of said posts relative to each other may be regulated so that said posts extend respectively through the corners of a rectangle of a given size; a pair of stationary vertical frameworks fixed to and extending upwardly from said base and respectively extending along one of said first pair of sides thereof and one of said second pair of sides thereof and each of said frameworks including a plurality of horizontal arms respectively located at different elevations and extending across said base; a pair of movable frameworks respectively carried by said base and respectively extending parallel to the other of said first pair of sides thereof and the other of said second pair of sides thereof, said movable frameworks being movable along said base parallel to said one of said first pair of sides thereof and said one of said second pair of sides thereof, respectively, and said movable frameworks each having also a plurality of horizontal arms located at different elevations and extending across said base; a plurality of tool carriers respectively carried by said horizontal arms and being shiftable therealong; and a plurality of tools carried by said carriers and by said tool carriers which are shiftable along said arms, all of the tools being respectively driven by individual motors.

5. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby by adjustment of said movable support on said base relative to said stationary support and by adjustment of said movable carriers on said supports relative to said stationary carriers the positions of said posts relative to each other may be regulated so that said posts extend respectively through the corners of a rectangle of a given size; four magazines carried by said carriers, each of said magazines including a pair of vertical channel members fixed to and extending upwardly from a pair of adjacent carriers with the interiors of said channels directed toward each other so that a stack of frame members can be located in the pair of channels for slidable movement downwardly therealong with the ends of the frame members guided by the channels and the frame members extending across the space between the pair of channels, and each of said channels having side walls terminating at their lower ends at an elevation higher than the carriers carrying said channels, and means carried by the channels adjacent the terminations at the lower ends of the side walls thereof for releasing the frame members from the magazines one at a time, the four magazines being arranged along four sides of a rectangle, respectively, so that four stacks of elongated frame members will be stored in said magazines along four sides of a rectangle, respectively; four pairs of bars respectively located normally beneath the bottom ends of the side walls of the channel members of said magazines; elevating and lowering means carried by said carriers and respectively supporting said bars for vertical movement to predetermined elevations; and means carried by said bars and cooperating with said magazines for releasing the lower-most frame members from said magazines to fall on said bars and for advancing the frame members along said bars toward said posts while maintaining the advanced frame members respectively parallel to the four sides of a rectangle so that said frame members will be displaced away from said magazines to locations where work can be performed on said frame members without interference from said magazines.

6. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby by adjustment of said movable support on said base relative to said stationary support and by adjustment of said movable carriers on said supports relative to said stationary carriers the positions of said posts relative to each other may be regulated so that said posts extend respectively through the corners of a rectangle of a given size; four magazines carried by said carriers, each of said magazines including a pair of vertical channel members fixed to and extending upwardly from a pair of adjacent carriers with the interiors of said channels directed toward each other so that a stack of frame members can be located in the pair of channels for slidable movement downwardly therealong with the ends of the frame members guided by the channels and the frame members extending across the space between the pair of channels, and each of said channels having side walls terminating at their lower ends at an elevation higher than the carriers carrying said channels, and means carried by the channels adjacent the terminations at the lower ends of the side walls thereof for releasing the frame members from the magazines one at a time, the four magazines being arranged along four sides of a rectangle, respectively, so that four stacks of elongated frame members will be stored in said magazines along four sides of a rectangle, respectively; four pairs of bars respectively located normally beneath the bottom ends of the side walls of the channel members of said magazines; elevating and lowering means carried by said carriers and respectively supporting said bars for vertical movement to predetermined elevations; means carried by said bars and cooperating with said magazines for releasing the lower-most frame members from said magazines to fall on said bars and for advancing the frame members along said bars toward said posts while maintaining the advanced frame members respectively parallel to the four sides of a rectangle so that said frame members will be displaced away from said magazines to locations where work can be performed on said frame members without interference from said magazines; and holding means cooperating with the ends of the released frame members after the latter are moved away from said magazines for holding said frame members only at their ends so that elongated edges and sides of said frame members may be finished by suitable tools.

7. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby by adjustment of said movable support on said base relative to said stationary support and by adjustment of said movable carriers on said supports relative to said stationary carriers the positions of said posts relative to each other may be regulated so that said posts extend respectively through the corners of a rectangle of a given size; and raising means extending along at least a pair of said posts for raising a vertical frame upwardly along the same, said raising means including a pair of elongated tubes formed with longitudinal slots, an elongated member movable along the interior of said tube, and a pawl carried by said elongated member, and extending through said slot for engaging a frame member to raise the latter, said pawl being movable downwardly beyond a frame member but being incapable of moving upwardly past a frame member so that said pawl will carry a frame member to a given elevation and can then be lowered downwardly away from the frame member.

8. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby an adjustment of said movable support on said base relative to said stationary support and by adjustment of said movable carriers on said supports relative to said stationary carriers the positions of said posts relative to each other may be regulated so that said posts extend respectively through the corners of a rectangle of a given size; raising means extending along at least a pair of said posts for raising a vertical frame upwardly along the same, said raising means including a pair of elongated tubes formed with longitudinal slots, an elongated member movable along the interior of said tube, and a pawl carried by said elongated member, and extending through said slot for engaging a frame member to raise the latter, said pawl being movable downwardly beyond a frame member but being incapable of moving upwardly past a frame member so that said pawl will carry a frame member to a given elevation and can then be lowered downwardly away from the frame member; and a plurality of pawls respectively carried by said posts at different elevations to be moved upwardly by said frame members as the latter move upwardly along said posts, said pawls carried by said posts being incapable of being moved downwardly by said frame members so that once the frame members move beyond the pawls carried by said posts said frame members can rest on the latter pawls while the pawls of said elongated members in said tubes can then be moved back down away from the thus-raised frame members.

9. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby an adjustment of said movable support on said base relative to said stationary support and by adjustment of said movable carriers on said supports relative to said stationary carriers the positions of said posts relative to each other may be regulated so that said posts extend respectively through the corners of a rectangle of a given size; raising means extending along at least a pair of said posts for raising a vertical frame upwardly along the same, said raising means including a pair of elongated tubes formed with longitudinal slots, an elongated member movable along the interior of said tube, and a pawl carried by said elongated member, and extending through said slot for engaging a frame member to raise the latter, said pawl being movable downwardly beyond a frame member but being incapable of moving upwardly past a frame member so that said pawl will carry a frame member to a given elevation and can then be lowered downwardly away from the frame member; a plurality of pawls respectively carried by said posts at different elevations to be moved upwardly by said frame members as the latter move upwardly along said posts, said pawls carried by said posts being incapable of being moved downwardly by said frame members so that once the frame members move beyond the pawls carried by said posts said frame members can rest on the latter pawls while the pawls of said elongated members in said tubes can then be moved back down away from the thus-raised frame members; and pressing means respectively carried by said posts at an elevation slightly higher than said pawls thereof for pressing the frame members against said pawls of said posts.

10. In a machine for manufacturing rectangular frames, in combination, a rectangular base having a first pair of opposed parallel sides and a second pair of opposed parallel sides perpendicular to said first pair of sides; an elongated stationary support carried by said rectangular base and extending along one of said first pair of parallel sides thereof; a movable support carried by said rectangular base and extending parallel to the other of said first pair of parallel sides thereof, said movable support being movable along said second pair of parallel sides of said base toward and away from said stationary support; a stationary carrier fixedly carried by each of said supports adjacent one end thereof and each of said stationary carriers having an inner corner directed toward the center of said rectangular base; a movable carrier carried by each of said supports for longitudinal movement therealong toward and away from the stationary carrier carried thereby, and each of said movable carriers having an inner corner also directed toward the center of said rectangular base; four posts respectively fixed to and carried by said carriers at said inner corners thereof and extending upwardly therefrom, said four posts being parallel to each other, whereby an adjustment of said movable support on said base relative to said stationary support and by adjustment of said movable carriers on said supports relative to said stationary carriers the positions of said posts relative to each other may be regulated so that said posts extend respectively through the corners of a rectangle of a given size; raising means extending along at least a pair of said posts for raising a vertical frame upwardly along the same, said raising means including a pair of elongated tubes formed with longitudinal slots, an elongated member movable along the interior of said tube, and a pawl carried by said elongated member, and extending through said slot for engaging a frame member to raise the latter, said pawl being movable downwardly beyond a frame member but being incapable of moving upwardly past a frame member so that said pawl will carry a frame member to a given elevation and can then be lowered downwardly away from the frame member; a plurality of pawls respectively carried by said posts at different elevations to be moved upwardly by said frame members as the latter move upwardly along said posts, said pawls carried by said posts being incapable of being moved downwardly by said frame members so that once the frame members move beyond the pawls carried by said posts said frame members can rest on the latter pawls while the pawls of said elongated members in said tubes can then be moved back down away from the thus-raised frame members; pressing means respectively carried by said posts at an elevation slightly higher than said pawls thereof for pressing the frame members against said pawls of said posts; and tool means located at the elevations of said pawls of said posts for acting on frame members pressed against said pawls on said posts by said pressing means.

11. In a machine for manufacturing rectangular frames, in combination, means for supporting in a common plane a rectangular frame composed of four frame members and four additional frame members adapted to be formed subsequently into a rectangular frame and being parallel to and aligned with said four frame members of said first-mentioned rectangular frame respectively spaced from the latter frame members; and tool means for finishing the outer periphery of said first-mentioned rectangular frame and for simultaneously finishing at least part of said four frame members while the latter are supported in said plane with said first-mentioned rectangular frame.

References Cited in the file of this patent

UNITED STATES PATENTS

| | | |
|---|---|---|
| 448,465 | Thiemeyer | Mar. 17, 1891 |
| 553,094 | Becht | Jan. 14, 1896 |
| 585,887 | McRae | July 6, 1897 |
| 1,021,703 | Quinlan | Mar. 26, 1912 |
| 1,247,259 | Gell | Nov. 20, 1917 |
| 1,305,398 | Neff | June 3, 1919 |
| 1,464,020 | Anderson et al. | Aug. 7, 1923 |
| 2,209,379 | Bell | July 30, 1940 |
| 2,396,885 | Roloson | Mar. 19, 1946 |
| 2,544,499 | Hovey | Mar. 6, 1951 |

FOREIGN PATENTS

| | | |
|---|---|---|
| 538,280 | Belgium | July 3, 1959 |